United States Patent [19]

Kawashima

[11] Patent Number: 4,907,903
[45] Date of Patent: Mar. 13, 1990

[54] REPRESENTING UTENSIL

[76] Inventor: Kiyoharu Kawashima, 5-7, Esaka-cho 5-chome, Suita-shi, Osaka-fu, Japan

[21] Appl. No.: 235,696

[22] Filed: Aug. 16, 1988

Related U.S. Application Data

[63] Continuation-in-part of Ser. No. 82,728, Aug. 7, 1987, abandoned.

[51] Int. Cl.$^4$ .......................... B43K 5/10; B60D 5/00
[52] U.S. Cl. .................................... 401/151; 401/209; 106/21; 106/22
[58] Field of Search .................. 401/151, 209; 106/21, 106/22, 29, 30

[56] References Cited

U.S. PATENT DOCUMENTS

| | | | |
|---|---|---|---|
| 3,951,892 | 4/1976 | Drury, Jr. et al. | 106/29 X |
| 4,111,702 | 9/1978 | Fraik | 106/21 X |
| 4,162,164 | 7/1979 | Lin | 106/21 |

Primary Examiner—Alan W. Cannon
Attorney, Agent, or Firm—Stevens, Davis, Miller & Mosher

[57] ABSTRACT

A representing utensil for use in making an invisibly depicted matter visible again which houses a coloring assistant in its own container is disclosed, wherein the coloring assistant is able to make a colorlessly depicted matter develop color and, after its coloring, do the short-time fading at which time the color is losen of itself in a relatively short time by acting on the depicted matter with the aid of a coloring agent, and further is able to make the depicted matter do repeat the recoloring and the short-time fading each time when the coloring assistant acts on the depicted matter a plural number of times.

1 Claim, 2 Drawing Sheets

REPRESENTING UTENSIL

This application is a continuation-in-part of application Ser. No. 082,728, filed Aug. 7, 1987 now abandoned.

BACKGROUND OF THE INVENTION

This invention relates to a representing utensil for use in making an invisibly depicted matter visible again, more particularly, a utensil which is designed so as to enable the depicted matter, which has been depicted with a coloring agent including an alkaline pH-indicator, to repeatedly develop color by the use of a coloring assistant including an alkaline pH-adjusting agent. Heretofore, there have been proposed various kinds of representing utensils by means of which depicted or printed matters being produced in an invisible state are to be made to develop color later on. By way of example, as seen in Japanese Patent Application Disclosure No. 135720 of 1976, there is a system on which an invisibly printed matter produced with an ink containing such a coloring agent as metallic salts of n-alkyl piridium is made to develop color by using a color-manifesting liquid containing salicylic acid. However, in such a system using the color-manifesting liquid of this kind, when the coloring has been done even once, it became impossible to repeat. On the other hand, as seen in Japanese Utility Model Publication No. 52063-1981, there is proposed a set for printed matters wherein the color is developed by causing a coloring assistant containing sodium carbonate and zinc chloride to act on its invisible printed part wherein the printed part is produced with a printing ink containing phenolphthalein. However, in the matter thus produced, the coloring is not only unclear, rather it is intended that the coloring assistant perpetuate the coloring as long as possible after the invisible printed part once has developed color by making its coloring agent contain zinc chloride and the like for the purpose of preventing the color-developed matter from growing weak with the passage of time and fading away in the end.

As mentioned above, there has not been heretofore proposed in any of the prior art a device which is intended to develop color, and then, of its own nature to lose its color in a short time after having developed color and to be reused by repeating the coloring and fading cycle.

On the contrary, our invention has for its object the provision of a representing utensil which has the ability to make visible whenever occasion calls for a depicted matter being invisibly prepared by handwriting or by stamping while using a coloring agent containing a pH-indicator, and further to make it possible not only to obtain fading color in a relatively short time but also to permit the repeated performance of the process of coloring and fading a number of times.

SUMMARY OF THE INVENTION

It is an object of this invention to provide a representing utensil being able to make a depicted matter develop color by acting thereon and permit the color to fade of its own accord.

Another object of this invention is to provide a representing utensil being designed so as to be able to carry out the above-mentioned color-developing-fading cycle in a short time.

A further object of this invention is to provide a representing utensil being designed so as to be able to carry out repeatedly the process of coloring and fading a number of times.

DETAILED DESCRIPTION OF THE INVENTION

Figure 1A:
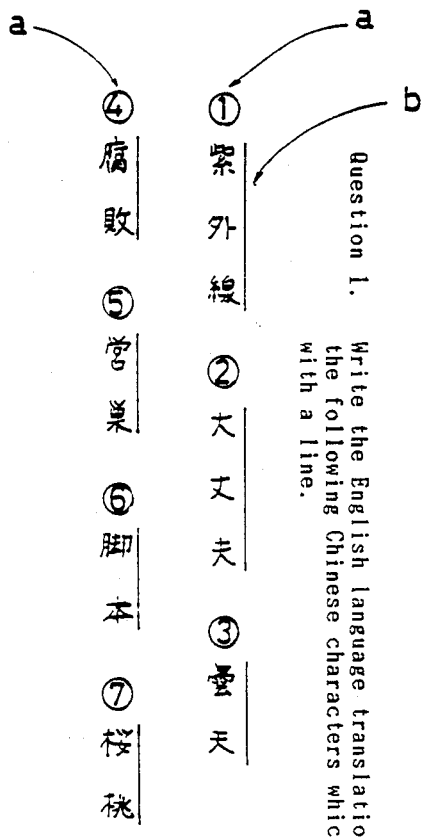
FIG. 1(a) is a top view showing an example of a part of the content of the printed matter.

The representing utensil of this invention is used for temporarily developing color of a depicted matter which is depicted with a coloring agent including an alkaline pH-indicator. Indicators such a γ-dinitrophenol, p-nitrophenol, m-nitrophenol, cyanine, α-naphthol phthalein, ethyl bis-acetic acid, phenolphthalein, o-cresol phthalein, thymol phthalein, and bromophenol purple have been well known as pH-indicators, as shown in Table 1. These pH-indicators each have respective pH-ranges where they assume colorless appearance, and coloring appearances. But the preferred pH-indicator concerned with this invention is one in which the pH-value causing color appearance is higher than pH-7 (that is an alkaline pH-indicator). The coloring agent which can be used in this invention may have one sort, or a mixture of a plurality of sorts, of said alkaline pH-indicators.

The coloring agents are adjusted usually to a colorless state, but they can be also prepared so as to become colorless, though being colored at the outset, through either desiccation and other methods after having been depicted. On the other hand, when pH-indicators are dissolved using solvents such as alkaline solution or alcohol, the solvent can be evaporated. When the coloring agents are used for depicting by printing, or when it is preferable that they have viscosity to some extent, then an ink vehicle is kneaded into the dissolved liquid. By the way, as the ink vehicle, there can be used a kind of water-holding agent such as polyhydric alcohol, a surface active agent, oils, and various kinds of resins, if occasion arises. As resins, there may be used rosin, shellac, guaiac gum, methyl cellulose, ethyl cellulose, and the like. These substances also work as thickeners.

The coloring agents may also be prepared by kneading the pH-indicators into the ink vehicles after having ground the pH-indicators into fine grains instead of making them dissolve in a solvent. Otherwise, it is possible to knead the pH-indicators, dissolved in solvent, into the ink vehicles after having the former made to be adsorbed onto suitable organic or inorganic powders.

As for the coloring agents, they can be made to contain some acidic pH-adjusting agent. This pH-adjusting agent is useful here for keeping the pH-indicator within the colorless pH-range, and it is further used for making the pH-indicator continue to be held within the colorless range even after the alkaline coloring assistant is permitted to repeatedly act thereon. For this purpose, as the pH-adjusting agents, there are used such agents as tartaric acid or citric acid as having a long-holding efficacy.

The depicted matter initially depicted in a colorless state with the coloring agent of the aforementioned kind develops color upon the action of the coloring assistant and loses color or fades in a short time after the coloring.

The above coloring assistant for developing the color of the coloring agent contains an alkaline pH-adjusting agent, while on the other hand this pH-adjusting agent has contained therein an alkaline substance dissolved in a solvent.

As the pH-adjusting agent, there can be used such an agent as to facilitate the fading effect within a short period of time after being applied to the depicted matter.

This fading effect with the passage of time takes place through the volatilization of the alkaline substance itself, or through the evaporation of the solvent (chiefly, water) which is used to dissolve the alkaline substance. Incidentally, this fading effect occurs under the usual ambient conditions.

As examples of the alkaline substances losing effect through volatilization, there are such ones as ammonia, monoethanol amine, a class of ethyl amines, a class of propyl amines, 2-ethyl-hexyl-oxypropyl amine, 3-ethoxypropyl amine, 3-methoxypropyl amine, diisobutyl amine, secbutyl amine, a class of isopropanol amines, a class of ethanol amines, 2-ethylhexyl amine, a class of ethylene amines, and the like.

The fading effect through the desiccation of the moisture of the pH-adjusting agent is based on the utilization of the loss of its ionic dissociation power. There are many pH-adjusting agents having such a property as noted above, but it is difficult to dry up their moisture completely enough to satisfy practical use. Accordingly, agents such as diisopropanol amine, triisopropanol amine, diethanol amine, which substantially lose the ionic dissociation power on the basis of the concentration exceeding a certain degree are suitable for practical use. But with due regard to physical safety, especially with regard to oral toxicity, skin irritation, and eye irritation, N,N-dimethylethanol amine is the only substance having a practical utility as the alkaline substance, and this alkaline substance (that is, N,N-dimethylethanol amine) is dissolved into water.

The pH-adjusting agents are adjusted so that the alkaline substances added thereto may become 4~20 parts to the whole amount of the coloring assistants. Incidentally, when the alkaline substances here are less than 0.4 parts, the color-developing by the coloring agents is not enough and consequently inferior for practical use. On the contrary, when being more than 20 parts, their efficacy becomes excessive, thereby damaging the paper whereon the depicted matter is depicted or the container of the representing utensil, and further increasing the chance of physical danger upon misuse.

The coloring assistants make the pH-indicators contained in the coloring agents develop color by being applied to the depicted matter, and that developed color fades accordingly as the alkaline substance loss its ionic dissociation power with the passage of time.

In the coloring assistant, the acidic substance, that is citric acid, is contained at the rate of from 0.05 to 3 parts. This citric acid, being a sort of involatile acidic substance, maintains the acidic effect for a long time, and the purpose of this citric acid is to assure the fading and to keep stable the invisible condition for a long time after losing the effect of the alkaline substance. Another purpose is to prevent eye damage even if the coloring assistant is accidentally put into contact with the eye. Furthermore, in this invention, 0.05 to 3 parts of sodium chloride is added into the coloring assistant for the protection of the eye. When the acidic substances contained in the coloring assistants are less than 0.05 parts, then the color-fading does not take place satisfactorily, but when being over 3 parts, then the color-developing of the coloring agents becomes incomplete, and when the coloring is repeated, the deposit of the acid matter is ready to be accumulated, thereby leading to the lowering of the number of repeating cycles.

The concentrations of the coloring assistants are decided depending on the physical safety and the pH-values at which the pH-adjusting agents develop color.

Furthermore, in this invention, the coloring assistant is mixed with a suitable quantity of activated charcoal. This activated charcoal adsorbs the impurities in the coloring assistant, such as some deposits which appear by chemical reaction between the alkaline substances. The activated charcoal also prevents the coloring assistant and the tip of the container of the utensil, used for painting, from deteriorating and growing yellowish in color with the passage of time.

The depicted matter develops color again after the short-time fading by causing the coloring assistant to again act therewith, and then it again loses color within a short time. The process of this coloring and fading can be repeated a plural number of times.

This repeatability is associated with the clearness at the time of coloring, and therefore, if the clearness is made to be elevated, a number of repeating times is so many increase. This clearness is decided by the adjustment of the coloring agent, and also by the coloring assistant, and further by the selection of the quality of paper used. The concentration of the coloring agent becomes higher, the clearness of the coloring will be elevated, and consequently a number of repeating times thereof will be increased.

The clearer the coloring is at the initial stage, the more it relives the degradation of the coloring, even after redeveloping color a plural number of times. Accordingly, the clearness contributes to the elevation of the number of repeating times. The number of repetitions is able to be elevated by the concentration of the alkaline pH-adjusting agent or the citric acid in the coloring assistant.

As described above, the representing utensil according to our invention has the property not only of permitting fading of the color in a short time, for example, in about 2 to 15 minutes after having developed the color, at a temperature of 25° C. and at the humidity of 65% and on the basis of the selection of all conditions such as the adjustment of the coloring agent, the adjustment of the coloring assistant, and/or the choice of the quality of paper, but also exhibiting the characteristic that the representing utensil has the practical utility of increasing the physical safety and repeatability of application.

In Table 1, there are exemplified several combinations of pH-indicators with coloring assistants. In Table 1, there are further given the pH-values at which the above-mentioned pH-indicators develop color, namely, the coloring pH; the pH-values at which they lose color, namely, the fading pH; the sorts of the colors; and the approximate values of the required times after coloring until natural fading. The coloring pH is the value of the concentration at which the printed part is made to become recognizable or legible easily with the person's eye by the action of the coloring assistant. The time required from coloring to fading is adjusted in such a manner as mentioned above. Table 1 shows the case where the depicted matter is depicted by printing with the coloring agent made as printing ink. This ink contains denatured alcohol 75 parts, water 15 parts, a surface active agent 10 parts, the tartaric acid 10 parts, and thymol cellulose 2 parts. The values of time given in the far right column of Table 1 exemplify the cases where the printing was done using the coloring ink containing the pH-indicators of the portions described in Table 1.

The representing utensil 1 according to the invention has the coloring assistant impregnated in various kinds of pen-type containers such as, besides felt pens, markers for underlining equipped at their heads with acryl tips or polyester tips, and others. It is possible to provide the coloring assistant in containers having at the container heads some sponge-like applying means, or also in various kinds of containers such as sprays, cans, bottles and the like, in a liquid state. At the time of contact, it does not matter whether the application is conducted using means such as writing brushes, paintbrushes, rubbers, sponge rollers, and others.

It is needless to say that the coloring agent may be used ordinarily for printing ink, but it is able to be made to be contained in various containers similar to those used for the coloring assistant, preferably in a pen-type container 3, serviceable for writing. The coloring agent may also be made to be impregnated in a stamp pad in order to be depicted by the use of a seal. In printing, such a coloring agent is used for depicting on anything of various form and use such as not only various kind of papers forming books, newspapers, weekly publications, etc. pamphlets, catalogues, etc., and further solid things like packing boxes, terrestrial globes, etc. The quality of the material of the printed body runs the whole gamut of papers: machine-made papers (fine, medium, rough) of European style or hand-made papers of Japanese style. It is preferable to use a fine quality of paper for the purpose of increasing the number of times of repeated use, however, it is recommended to make the selection of papers used by taking into consideration which sort of paper will be most economical. In the same sense, the printing can be performed not only on paper but also on fibers, wood, etc. The printing is able to be done by using various sorts of printing techniques such as surface printing, gravure, mimeography, offset (inclusive of dry offset), etc. Further, the printed body can be printed invisibly, in part or in whole, abreast of the other part visibly printed by using, for example, black ink. In this case, the spaces setting the portions which are required for the spaces for notes serving as answers are printed visibly, while the spaces for notes are printed invisibly with the ink containing the coloring agent.

The colorless depicted matter being depicted with the coloring agent develops color to become visible in this way by making the coloring assistant act thereon through the use of the representing utensil according to the invention, and loses color in a short time according to the fading effect with the passage of time. Further, the depicted matter can repeat the process of the coloring and fading under the repeated applications of the coloring assistant. Accordingly, in the case of making the printing by the use of the coloring agent, for example, when the spaces for notes serving as answers and others in teaching materials are printed as invisibly printed parts abreast of the spaces for questions, those spaces for notes come into view by being made to develop color under the action of the representing utensil, whereby the answer becomes easily recognizable, so that the study can be continued without interrupting the stream of exercise. In this way, the repeated mutation of coloring and fading increases the absorbing interest of the exerciser and prevents the learning from becoming monotonous. More than that, since the fading takes place in a short time after coloring, it is possible to solve the question repeatedly without the eyes toward the answer, thereby elevating the efficiency of study. Also, for the purpose of learning foreign languages, the depicted matter here can be used in such a manner so as to make translated sentences, titles of translations, etc., develop color visibly in compliance with one's request. On the other hand, as for the coloring agent, it can also be formed into a kind of writing utensil by being filled in a penholder in the form of a line marker, by the use of which some colorless depicted matter can be depicted at will, and it is made to develop color repeatedly each time when using the representing utensil. At this time, the above container containing coloring assistant comes to constitute a representing utensil set together with the representing utensil. This representing utensil set serves as a learning means or a playing article. Further, by using such a writing utensil, it becomes possible to depict an invisible depicted matter on the paper or the like. If handing over this paper to a person, it can be utilized as a business article for conveying some secret information. In this case, it may be possible to use a kind of label for indicating the spot of such depicted matters.

EXAMPLE 1

Description will be done taking the case where the coloring agent is used in a reference book of study, namely, the printed matter shown in FIG. 1(a).

The questions-setting part (a) was printed using the ink containing an ordinary blank pigment, and the letters printed at the side, that is, the notes space for answers (b) was printed at its right side by using the coloring ink according to the invention so as to be usually invisible.

The coloring ink used here was made as having the following composition:

| | |
|---|---|
| o-cresol phthalein | 12 parts |
| surface active agent belonging to the group of higher alcohol | 40 parts |
| surface active agent belonging to the group of fatty acid | 25 parts |
| triethanol amine | 15 parts |
| glue | 0.5 parts |
| linseed oil | 5 parts |

The printing was carried out on a movable-type printing machine, and the paper used was of fine quality.

On the other hand, the coloring assistant was prepared in the following composition:

| | |
|---|---|
| ammonia | 1 part |
| caustic soda | 0.2 parts |
| water | 100 parts |
| thickener | 0.5 parts |
| surface active agent | 9 parts |

Figure 1B:
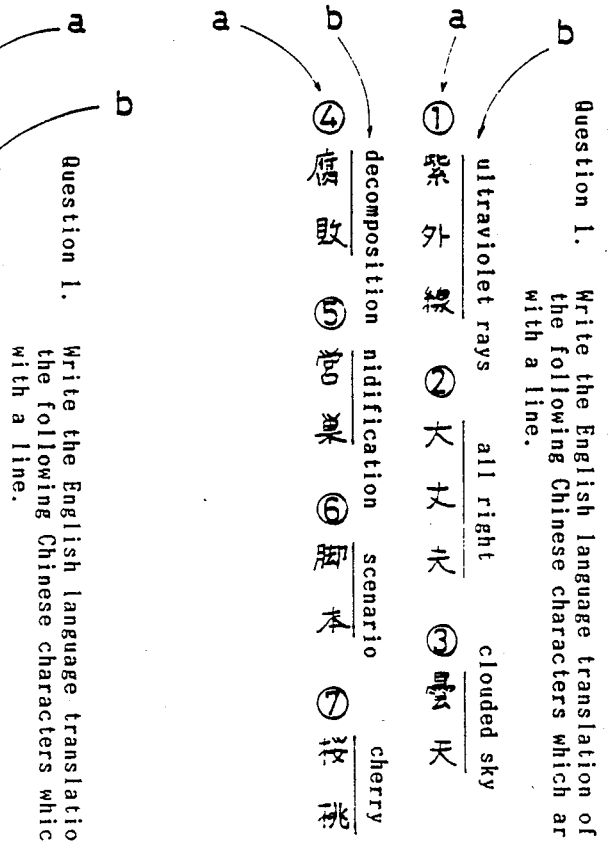
FIG. 1(b) is a top view showing a state where the above content has developed color under the action of a coloring assistant thereon.
Figure 2:
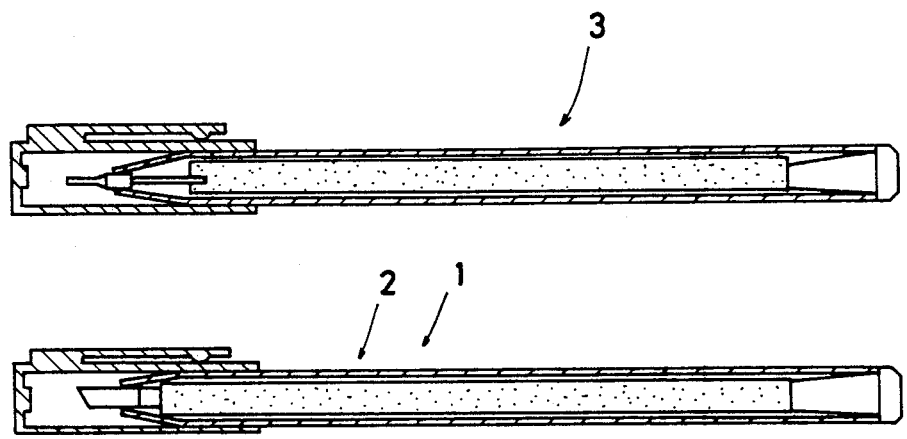
FIG. 2 is a cross-sectional view showing a representing utensil set according to the invention.

A marking pen equipped with a polyester tip having at its head a chisel-cut part was made by impregnating a core filter for the marking pen where a polyester fiber was wound by a polyethylene film, with a solution made in the above composition. When the right side face from the vertical line of the question-setting space (a) in FIG. 1(a) was stroked with the above-mentioned marking pen, then the letters printed invisibly at its side, that is the notes space (b) turned purple, as shown in FIG. 1(b), and the developed color, however, disappeared after 5 minutes, to say for the springtime only. After having been dried, the mutation mentioned above could be repeated for the second time. In this way, the marking pen here was able to be used thirty (30) times over and over again.

EXAMPLE 2

The printing was made on an offset printing press and on the fine quality of paper by using the coloring ink of the composition mentioned below.

| | |
|---|---|
| rosin denatured phenol resin | 20 parts |
| rosin denatured alkyl resin | 25 parts |
| xylol | 15 parts |
| turbine oil | 5 parts |
| linseed oil | 0.5 parts |
| surface active agent | 10 parts |
| thymol phthalein | 10 parts |

On the other hand, the coloring assistant was prepared in the following composition:

| | |
|---|---|
| 3-ethoxypropyl amine | 15 parts |
| denatured alcohol | 50 parts |
| 5%-aqueous solution of tartaric acid | 35 parts |

When making the coloring assistant act on the printed matter after the printing was done, the blue color appeared thereon and disappeared of itself in about 2 minutes. Repeating such a process, the printed matter was able to be used more than 20 times.

EXAMPLE 3

The coloring agent was prepared in the following composition:

| | |
|---|---|
| o-cresol phthalein | 6 parts |
| ethanol | 70 parts |
| water | 13 parts |
| ethyl cellulose | 0.5 parts |
| citric acid | 0.5 parts |
| surface active agent | 10 parts |

A colorless depicted matter as taken down on a fine quality of paper by the use of a container 3 taking the form of a marking pen provided at its head with a plurality of capillary tubes and having the above-mentioned coloring agent within itself.

Next, the coloring assistant was prepared in the following composition:

| | |
|---|---|
| 3-ethoxypropyl amine | 15 parts |
| denatured alcohol | 55 parts |
| methyl cellulose | 0.4 parts |
| 5%-aqueous solution of tartaric acid | 29.5 parts |

By making the above-mentioned coloring assistant be contained in a container in the form of a line marker provided at its head with a polyester tip, the representing utensil according to the invention was formed. When applying this coloring assistant to a depicted matter, then the depicted matter developed a purple color, and lost this color after 3 minutes. This process of coloring and fading could be repeated more than 30 times. This writing utensil set is very serviceable for the secret correspondence, the preparation of secret documents, the entry of notes into the teaching materials and others, and further the recognition of those things in the future.

EXAMPLE 4

The coloring agent was prepared in the following composition:

| | |
|---|---|
| phenolphthalein | 10 parts |
| dimethyl sulfoamide | 8 parts |
| isopropanol | 30 parts |
| water | 31.5 parts |
| propyl glycol | 10 parts |
| citric acid | 0.5 parts |
| surface active agent | 10 parts |

The above-mentioned coloring agent was mde to be contained in a stamp pad having felt within. By affixing a rubber stamp to a paper of fine quality through the utilization of the above stamp pad, a depicted matter was obtained.

Now when making the representing utensil 1 of the same coloring assistant as used in Example 2 act on the above-mentioned depicted matter, then the latter developed the red color, and after 4 minutes, it lost color. The process of coloring and fading was able to be repeated more than 15 times. A stamp pad set consisting of the above-mentioned stamp pad and the representing utensil is available for making the entry of the hidden numbers of the secret papers as regards commercial goods or of the hiding name of a private person, and the like.

A coloring assistant consisting of 8.5 weight % of N,N-dimethylethanol amine, 0.1 weight % of citric acid, 0.1 weight % of sodium chloride and water was tested for toxic effects by United states Testing Company, Inc.

1. TEST FOR TOXIC EFFECTS; ACUTE ORAL TOXICITY, SCREENING

Procedure:

Ten Sprague Dawley rats (5 male and 5 female) each weighing between 200 and 300 grams, were selected for each dosage. The animals were housed in wire mesh cages with raised floors in a conditioned animal room. The animals were maintained on a commercial rat food diet. Water was available ad libitum. Twelve to twenty-four hours prior to the administration of each sample, all food was removed, the animals' weight recorded and each animal identified. The dosage to be administered was calculated based on the animal weight.

Liquid Samples:

The sample was fed to the unanesthetized animals by oral intubation using a 16 gauge "ball point" needle and syringe.

Solid Samples:

Animal feed containing 3.0 g of sample equivalent to 15 g/kg of dose per day was submitted to the test animals for 24 hours, resulting in a total dosage of 15 g/kg. Bedding was checked daily for percentage loss of sample.

The animals were then returned to their cages for observation of gross toxicological effects immediately after administration of the sample, after one hour, after four hours and once daily thereafter, for a period of fourteen days.

Requirements:

The dosed sample should not elicit any toxic effects when dosed at 15 grams of sample per kilogram of animal weight to be considered essentially non-toxic.

Results: Oral Toxicity - Screen, Single Dose Rats

|  | Average Initial Weight (g) | Dose g/kg | 14-day Mortality | Average Final Weight (g) |
|---|---|---|---|---|
| 5F | 208 | 5 | 0/5 | 252 |
| 5M | 210 | 5 | 0/5 | 328 |

Conclusion:

When tested as specified, the submitted sample was found to be non-toxic following oral administration at 15 g/kg.

2. TEST FOR TOXIC EFFECTS; PRIMARY SKIN IRRITATION

Procedure:

The test was conducted in accordance with the procedures of the Federal Hazardous Substances Act, as outlined in the Code of Federal Regulations, Title 16, Chapter IIc, paragraph 1500. 41.

Six New Zealand Strain Albino rabbits are selected for the test. The hair is clipped from the back and flank of the animal. Patches (2.5 cm×2.5 cm) of surgical gauze are applied to the abraded and unabraded area of the skin by using thin bands of mild adhesive tape.

(A) Portions of 0.5 mls of the submitted sample are introduced under each of the patches in case of liquids.

(B) 0.5 g of the submitted sample are introduced under each of the patches in case of solids. Solids are moistened or dissolved in an appropriate solvent.

The trunks of the rabbits are then wrapped with rubberized cloth (or other neutral impervious material) to hold the patches in position and to retard evaporation of any volatile substances during the 24 hour exposure period. Upon removal of the patches, the resulting skin reactions are evaluated. Readings are also taken after 72 hours. The primary irritation score is derived by addition of each individual score and dividing the total score by 4. For the evaluation, the following rating scale is used. The combined average of primary irritation index is evaluated on the basis of scale weighted scores as follows:

| A. Erythema and Eschar Formation | |
|---|---|
| No erythema | 0 |
| Very slight erythema (barely perceptible) | 1 |
| Well defined erythema | 2 |
| Moderate to severe erythema | 3 |
| Severe erythema (beet redness) to slight eschar formation (injuries in depth) | 4 |
| Total possible erythema score | 4 |

| B. Edema Formation | |
|---|---|
| No erythema | 0 |
| Very slight edema (barely perceptible) | 1 |
| Slight edema (edges of area well defined by definite raising) | 2 |
| Moderate edema (area raised approximately 1 mm) | 3 |
| Severe edema (raised more than 1 mm and extending beyond area of exposure) | 4 |
| Total possible edema score | 4 |
| Total possible score for primary irritation | 8 |

Requirements:

The samples should not cause any detectable skin irritation.

Results: Primary Skin Irritation

| Erythema & Eschar | Period | 1 | 2 | 3 | 4 | 5 | 6 | Avg |
|---|---|---|---|---|---|---|---|---|
| abraded | 24 hrs | 0 | 0 | 0 | 0 | 0 | 0 | 0 |
| abraded | 72 hrs | 0 | 0 | 0 | 0 | 0 | 0 | 0 |
| unabraded | 24 hrs | 0 | 0 | 0 | 0 | 0 | 0 | 0 |
| unabraded | 72 hrs | 0 | 0 | 0 | 0 | 0 | 0 | 0 |
| Edema | Period | 1 | 2 | 3 | 4 | 5 | 6 | Avg |
| abraded | 24 hrs | 0 | 0 | 0 | 0 | 0 | 0 | 0 |
| abraded | 72 hrs | 0 | 0 | 0 | 0 | 0 | 0 | 0 |
| unabraded | 24 hrs | 0 | 0 | 0 | 0 | 0 | 0 | 0 |
| unabraded | 72 hrs | 0 | 0 | 0 | 0 | 0 | 0 | 0 |

Primary Irritation Score (Total Divided By 4) = 0

Conclusion:

When tested as specified, the submitted sample was not found to be a primary skin irritant.

3. TEST FOR TOXIC EFFECTS; EYE IRRITATION

Procedure:

The test was conducted in accordance with the procedures of the Federal Hazardous Substances Act, as outlined in the Code of Federal Regulations, Title 16, Chapter II, part 1500. 42.

Six adult New Zealand Strain rabbits are selected for the test. Only rabbits without eye defects or irritations are used in the test.

0.1 ml of the submitted sample (100 mg or less for most solids) is instilled in the conjunctival sac. Only one eye is so treated while the other eye serves as control. The eye lids are closed and held together for approximately one second. The animals are thereafter returned to their wire mesh cages with raised floors for examinations at 24, 48 and 72 hours after installation of the sample.

At the above-mentioned time intervals, the eyes of the animals are examined with aid of a hand slit-lamp and rated in accordance with the following scale.

| Cornea | |
|---|---|
| No ulceration or opacity | 0 |
| Scattered or diffuse areas of opacity but detail of iris clearly visible | (1)* |
| Barely discernible translucent areas, details of iris slightly obscured | 2 |
| Nacreous areas, no details of iris visible, size of pupil barely discernible | 3 |
| Complete corneal opacity, iris not discernible | 4 |
| Iris | |
| Normal | 0 |
| Markedly deepened folds, congestion, swelling, moderate circumcorneal injection, iris still reacting to light | (1)* |
| No reaction to light, hemorrhage, gross destruction | 2 |
| Conjunctivae | |
| Vessels normal | 0 |
| Some vessels definitely injected | 1 |

| | |
|---|---|
| Diffuse, crimson red, individual vessels not easily discernible | (2)* |
| Diffuse beefy red | 3 |
| Chemosis | |
| No swelling | 0 |
| Any swelling above normal | 1 |
| Obvious swelling with partial eversion of lids | (2)* |
| Swelling with lids about half closed | 3 |
| Swelling with lids more than half closed | 4 |

*Bracketed figures indicate lowest grades considered positive.

The rating was further aided by comparison with the illustrated Guide for Grading Eye Irritation by Hazardous Substances, Published by the Department of Health, Education and Welfare; Food and Drug Administration.

Requirement:

A sample is considered an "irritant", specifically an "eye irritant", by the definition of the Federal Hazardous Substances Act "if four or more of the animals in the test group exhibit a positive reaction." If only one animal exhibits a positive reaction, the test shall be regarded as negative. If two or three animals exhibit a positive reaction, the sample is considered a suspect eye irritant and does not comply with the Federal Hazardous Substances Act.

Results: Eye Irritation Study (Rabbits)

| | Animal Rating After 24 Hours | | | | | |
|---|---|---|---|---|---|---|
| | 1 | 2 | 3 | 4 | 5 | 6 |
| Cornea | 0 | 0 | 0 | 0 | 0 | 0 |
| Iris | 0 | 0 | 1* | 0 | 0 | 0 |
| Conjunctivae | 1 | 1 | 2* | 1 | 1 | 1 |
| Chemosis | 0 | 0 | 2* | 0 | 0 | 0 |

*Positive Reaction

| | Animal Rating After 48 Hours | | | | | |
|---|---|---|---|---|---|---|
| | 1 | 2 | 3 | 4 | 5 | 6 |
| Cornea | 0 | 0 | 0 | 0 | 0 | 0 |
| Iris | 0 | 0 | 0 | 0 | 0 | 0 |
| Conjunctivae | 1 | 0 | 2 | 1 | 1 | 1 |
| Chemosis | 0 | 0 | 1 | 0 | 0 | 0 |

| | Animal Rating After 72 Hours | | | | | |
|---|---|---|---|---|---|---|
| | 1 | 2 | 3 | 4 | 5 | 6 |
| Cornea | 0 | 0 | 0 | 0 | 0 | 0 |
| Iris | 0 | 0 | 0 | 0 | 0 | 0 |
| Conjunctivae | 1 | 0 | 1 | 0 | 1 | 0 |
| Chemosis | 0 | 0 | 1 | 0 | 0 | 0 |

Conclusion:

When tested as specified, the submitted sample was not found to be an eye irritant.

TABLE 1

| pH-indicator | amount to be added/100 g | coloring pH | fading pH | color | coloring assistants to be combined | time from coloring to fading (20° C., humidity 65% in room) |
|---|---|---|---|---|---|---|
| γ-dinitrophenol | 3 g | 5.8 | 4.0 | yellow | amine | 1 min.~1 hr. |
| p-nitrophenol | 3 g | 7.6 | 5.6 | yellow | amine ammonia | 1 min.~1 hr. |
| m-nitrophenol | 3 g | 8.4 | 5.5 | yellow | amines ammonia | 1 min.~1 hr. |
| cyanine | 4 g | 8.6 | 4.0 | blue | amines | 20 sec.~3 min. |
| α-naphtholphthalein | 2 g | 9.2 | 5.8 | blue | ammonia amines | 1 min.~2 hr. |
| ethyl bisacetic acid | 7 g | 10.5 | 7.5 | blue | ammonia amines NaOH, KOH | 10 sec.~12 hr. |
| phenolphthalein | 5 g | 10.2 | 7.5 | purple-red | ammonia amines NaOH, KOH | 10 sec.~12 hr. |
| O—cresol phthalein | 5 g | 10.5 | 7.4 | crimson | ammonia amines NaOH, KOH | 1 min.~12 hr. |
| thymol phthalein | 6 g | 11.6 | 8.6 | blue | ammonia NaOH, KOH | 1 min.~12 hr. |
| bromphenol purple | 5 g | 12.2 | 7.5 | purple | ammonia NaOH, KOH | 1 min.~1 hr. |

What is claimed is:

1. Representing utensil containing a coloring assistant, in its own container, for repeatedly developing color of a depicted matter which is invisibly depicted with a coloring agent including an alkaline ph-indicator; wherein said container is provided with activated charcoal therein, and said coloring assistant consists of 4 to 20 weight % N,N-dimethylethanol amine,
0.05 to 3 weight % of citric acid,
0.05 to 3 weight % of sodium chloride, and water.

* * * * *